(12) United States Patent
Ahluwalia et al.

(10) Patent No.: US 9,876,561 B2
(45) Date of Patent: Jan. 23, 2018

(54) METHOD FOR ROUTE PROPAGATION OVER A SATELLITE LINK, AND A SYSTEM THEREOF

(71) Applicants: Sandeep Ahluwalia, Gaithersburg, MD (US); Liqing Xiao, Clarksburg, MD (US); Ran Wang, Rockville, MD (US); Neha Jain, Clarksburg, MD (US)

(72) Inventors: Sandeep Ahluwalia, Gaithersburg, MD (US); Liqing Xiao, Clarksburg, MD (US); Ran Wang, Rockville, MD (US); Neha Jain, Clarksburg, MD (US)

(73) Assignee: Hughes Network Systems, L.L.C., Germantown, MD (US)

( * ) Notice: Subject to any disclaimer, the term of this patent is extended or adjusted under 35 U.S.C. 154(b) by 231 days.

(21) Appl. No.: 14/696,830

(22) Filed: Apr. 27, 2015

(65) Prior Publication Data

US 2016/0315691 A1    Oct. 27, 2016

(51) Int. Cl.
*H04B 7/185* (2006.01)
*H04L 12/741* (2013.01)
(Continued)

(52) U.S. Cl.
CPC ......... *H04B 7/185* (2013.01); *H04B 7/18528* (2013.01); *H04B 7/18584* (2013.01);
(Continued)

(58) Field of Classification Search
CPC ............... H04B 7/185; H04B 7/18528; H04B 7/18584; H04L 45/60; H04L 45/74; H04L 61/2007
See application file for complete search history.

(56) References Cited

U.S. PATENT DOCUMENTS 6,256,496 B1     7/2001  Dintelmann et al.
2005/0105524 A1* 5/2005  Stevens .............. H04L 45/04
                                            370/389

(Continued)

FOREIGN PATENT DOCUMENTS

EP      1422889 A2   5/2004
WO   2008097367 A2   8/2008

OTHER PUBLICATIONS

Hogie K. et al., "Link and routing issues for Internet protocols in space", Aerospace conference, 2001, IEEE Proceedings, Mar. 10-17, 2001, vol. 2, pp. 963-976.

(Continued)

*Primary Examiner* — Kan Yuen
(74) *Attorney, Agent, or Firm* — Capitol City TechLaw; Jasbir Singh

(57) ABSTRACT

A communication system, an apparatus and a method to route an Internet Protocol (IP) datagram with a standard internet routing protocol over a space link. The method including: routing according to the standard internet routing protocol including a current routing table including routing via the space link; receiving an Internet Protocol (IP) datagram including a destination; querying the routing stack to determine whether the destination is linked via the space link; and forwarding the IP Datagram to a space link address when IP datagram's destination is linked via the space link.

20 Claims, 5 Drawing Sheets

(51) Int. Cl.
  *H04L 29/12* (2006.01)
  *H04L 12/773* (2013.01)
(52) U.S. Cl.
  CPC .............. *H04L 45/60* (2013.01); *H04L 45/74* (2013.01); *H04L 61/2007* (2013.01)

(56) References Cited

U.S. PATENT DOCUMENTS

| | | | |
|---|---|---|---|
| 2008/0219266 A1* | 9/2008 | Agarwal | H04B 7/18528 370/392 |
| 2012/0020280 A1* | 1/2012 | Jansson | H04B 7/18582 370/316 |
| 2013/0109299 A1 | 5/2013 | Roos et al. | |
| 2015/0200909 A1 | 7/2015 | Markovitz et al. | |

OTHER PUBLICATIONS

Search report for International Application No. PCT/US2016/029444.
Search report for International Application No. PCT/US2016/029443.
Shahriar et al, "Mobility management protocols for next-generation all-IP satellite networks [architectures and protocols for mobility management in all-IP mobile networks]", IEEE Wireless Communications, vol. 14, No. 2, Apr. 1, 2008, pp. 46-54.

* cited by examiner

METHOD FOR ROUTE PROPAGATION OVER A SATELLITE LINK, AND A SYSTEM THEREOF

CROSS REFERENCE TO OTHER APPLICATIONS

The contents of co-filed U.S. patent application Ser. No. 14/696,887, filed Apr. 27, 2015, is incorporated herein in its entirety.

FIELD

The present disclosure relates to a method and a system for using a standard Internet routing protocol over a space link, and more particularly, between a satellite hub and a Very Small Aperture Terminal (VSAT) to facilitate the use of a routing protocol, such as, the Border Gateway Protocol (BGP) over the space link. By using a standard Internet routing protocol over the space link, an enterprise can use the feature set of the routing protocol across the enterprise including over the space link.

BACKGROUND

FIG. 1 illustrates a prior art enterprise satellite network. An enterprise satellite network 100 includes a head network 102 and a remote network 124. The head network 102 and the remote network 124 interface to one another by using an enterprise router 104 interfacing with a satellite gateway 106 that includes a satellite hub 108, a satellite 110 providing a space link 112 to link the satellite hub 108 with a Very Small Aperture Terminal (VSAT) 122, and a remote router 126. As such, a remote network 124 provided by the remote router 126 interfaces a remote node 128 including a remote device 130 to the head network 102. Typically, a satellite hub 108 interfaces the enterprise router 104 to the remote router 126 using the space link 112 provided by the satellite 110. The space link 112 is accessed by the satellite hub 108 at the head network 102 and by the VSAT terminal 122 at the remote networks 124 to form the enterprise network 100. Typically, the Enterprise Router 104 and the satellite gateway 106 are deployed at the head office of the enterprise. The remote router 126 and the VSAT 122 are deployed at a remote site or office of the enterprise.

Typically, the enterprise network 100 propagates IP routes using a standard routing protocol 140 between the enterprise router 104 and the satellite hub 108, a proprietary routing protocol 142 between the satellite hub 108 and the VSAT 122 over the space link 112, and a standard routing protocol 144 between the VSAT 122 and the remote router 126. Routing within a remote network 124 may be provided by a standard routing protocol 146.

The proprietary routing protocol 142 is used over the space link 112. Use of the proprietary routing protocol 142 has several limitations:

proprietary routing protocol 142 limits propagation of routes within the enterprise network 100 to options supported by the proprietary routing protocol 142;

its impractical to develop a proprietary routing protocol 142 to carry all possible routing options that an enterprise may wish to exchange;

the proprietary routing protocol 142 needs significant upkeep to match the constantly changing face of enterprise network;

developing the proprietary protocol stack 142 is an expensive and often buggy experience, whereas standard routing protocols have been battle hardened by years of use;

adds a burden to the enterprise personnel of learning how to utilize the proprietary routing protocol 142, and provides dissonance between the standard routing protocols 140 and 144, and the proprietary routing protocol 142.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

An apparatus to route an Internet Protocol (IP) datagram with a standard internet routing protocol over a space link is provided. The apparatus includes: a router stack configured to route according to the standard internet routing protocol including a current routing table including routing via the space link; and a router adaptation layer configured to: receive an IP Protocol (IP) datagram including a destination, query the routing stack to determine whether the destination is linked via the space link, and forward the IP Datagram to a space link address when IP datagram's destination is linked via the space link.

A system to route an Internet Protocol (IP) datagram with a standard internet routing protocol over a space link is provided. The system includes: a Very Small Aperture Terminal (VSAT) and a satellite hub. The VSAT including: a VSAT router stack configured to route according to the standard internet routing protocol including a VSAT current routing table including routing via the space link, and a VSAT router adaptation layer configured to receive an Internet Protocol (IP) datagram including a destination, query the VSAT routing stack to determine whether the destination is linked via the space link, and forward the IP Datagram to a space link address when IP datagram's destination is linked via the space link. The satellite hub including: a router stack configured to route according to the standard internet routing protocol including a current routing table including routing via the space link, and a router adaptation layer configured to receive an IP datagram including a destination, query the routing stack to determine whether the destination is linked via the space link, and forward the IP Datagram to a space link address when IP datagram's destination is linked via the space link. In the system, the router stack communicates with the VSAT router stack via the space link.

A method to route an Internet Protocol (IP) datagram with a standard internet routing protocol over a space link. The method includes: routing according to the standard internet routing protocol including a current routing table including routing via the space link; receiving an Internet Protocol (IP) datagram including a destination; querying the routing stack to determine whether the destination is linked via the space link; and forwarding the IP Datagram to a space link address when IP datagram's destination is linked via the space link.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Figure 1:
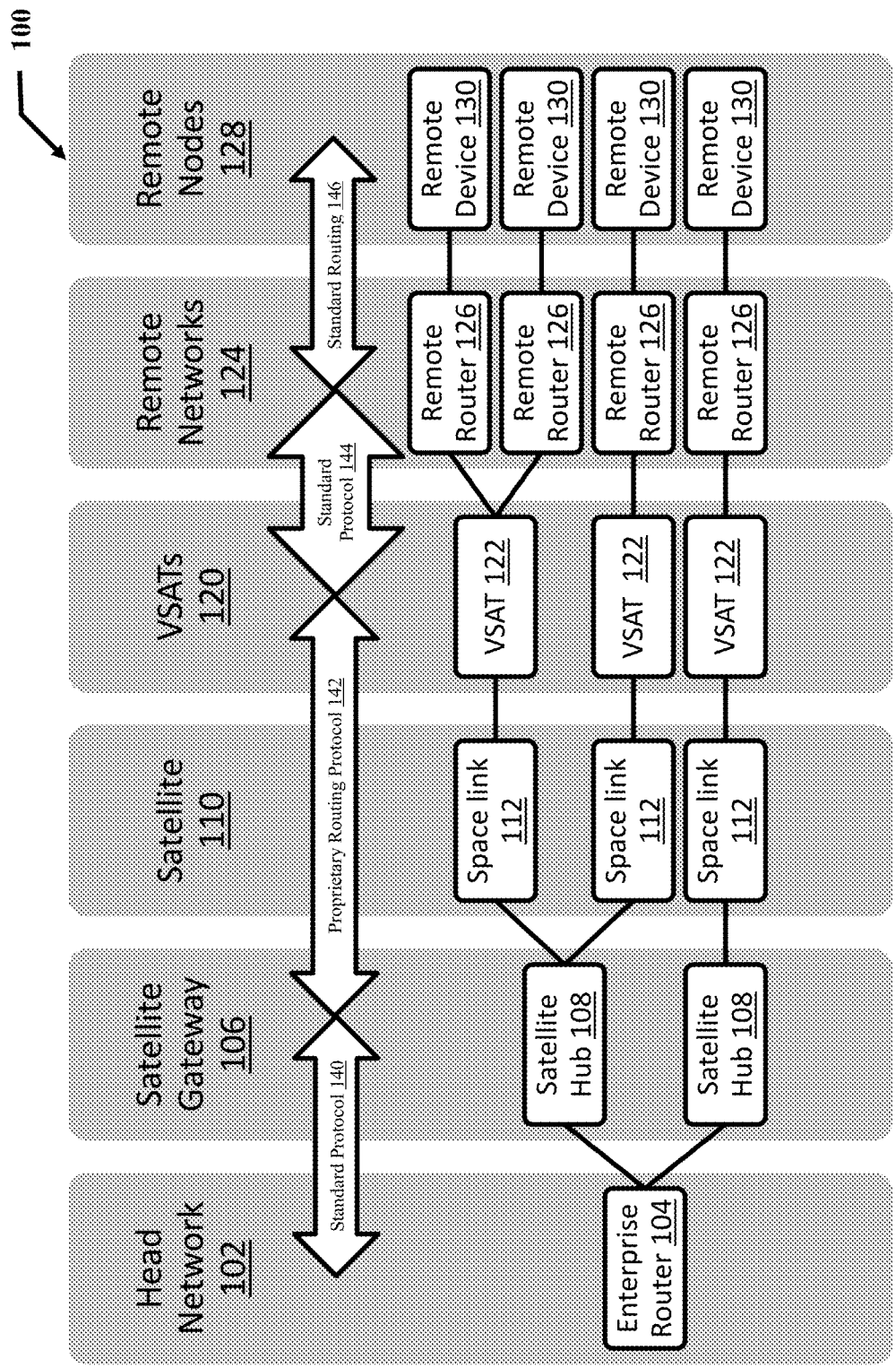
FIG. 1 illustrates a prior art enterprise satellite network.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

The terminology used herein is for describing particular embodiments only and is not intended to be limiting of the present disclosure. As used herein, the singular forms "a," "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first," "second," and the like does not imply any particular order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

Overview

A system, method, and apparatus for adding adaptors on a Satellite Hub and a Very Small Aperture Terminal (VSAT) to facilitate the use of a standard routing protocol, such as, the Border Gateway Protocol (BGP), over the space link is illustrated. With standard routing protocol on the space link, enterprises can use the standard routing protocol's rich feature set across the enterprise. In some embodiments, a router adaptation layer facilitates the use of industry standard protocol stacks over a satellite network that uses proprietary addressing. The router adaptation layer hides the details of the satellite network that uses proprietary addressing from a standard routing protocol stack.

Use of a standard routing protocol, such as, Border Gateway Protocol (BGP), provides several advantages. For example, BGP sends delta routing updates so it scales very well with increasing complexity of VSAT site network and increasing number of VSATs. Furthermore, full flexibility of the BGP routing is available over the space link including use of access lists and route maps to control the advertisement of routes, and use of BGP communities to group VSATs or networks. As such, routing rules can then be defined for the specified communities permitting a very fine grain control over routing in an enterprise. Moreover, the routing may be implemented with off-the-shelf standards compliant routing protocol stacks. This may improve product compatibility and interoperability as industry standard protocol stacks interoperate with routers from most manufacturers. Additionally, a standard routing software suite minimizes development costs and improves the reliability of the product as standard routing suites are well tested due to extensive use in the industry. Lastly, end user training costs are reduced as the network operators already know how to configure industry standard routing stacks.

The present disclosure provides an enterprise networking solution that enables large enterprise networks to connect via a satellite link. The enterprise network may be architected as a hub-and-spoke network. In some embodiments, the head office network may connect to a satellite gateway hub and the individual remote offices are connected via VSATs. The present enterprise networking solution also provides for exchanging routing information over a satellite or space link. The present enterprise networking solution also provides for mapping a proprietary addressing between the Satellite Hub and VSATs to standard IP addressing protocols. By allowing standard IP addressing to work over the space link, the routing information may be exchanged using standard routing protocols, rather than the proprietary routing protocols, between the satellite hub and VSATs.

A very small aperture terminal (VSAT) is a two-way satellite ground station or a stabilized maritime VSAT antenna with a dish antenna that is smaller than 3 meters. The parabolic shape of the dish has special reflective properties that enable it to concentrate and focus signals to a single point, i.e., the focal point. The dish receives and transmits signals, after reflecting and concentrating them, from and to satellites.

VSATs may be used to transmit narrowband data (point of sale transactions, such as, credit card, polling or RFID data; or SCADA), or broadband data (for the provision of Satellite Internet access to remote locations, VoIP or video). VSATs may be also used for transportable, on-the-move (utilizing phased array antennas) or mobile maritime communications. Very Small Aperture Terminal (VSAT) remote terminals may be used to communicate data, voice and video, to or from a remote site or location a satellite hub. The satellite hub provides a hub terminal including an outdoor transceiver and antenna, indoor integrated modem and multiplexing systems, a single-cable inter-facility link, and a variety of network interfaces that may simultaneously deliver traffic to a network backbone, for example, in TDM, ATM, and IP formats. Sectors may be provisioned for 1:N (e.g., N=4) active redundancy.

Figure 2:
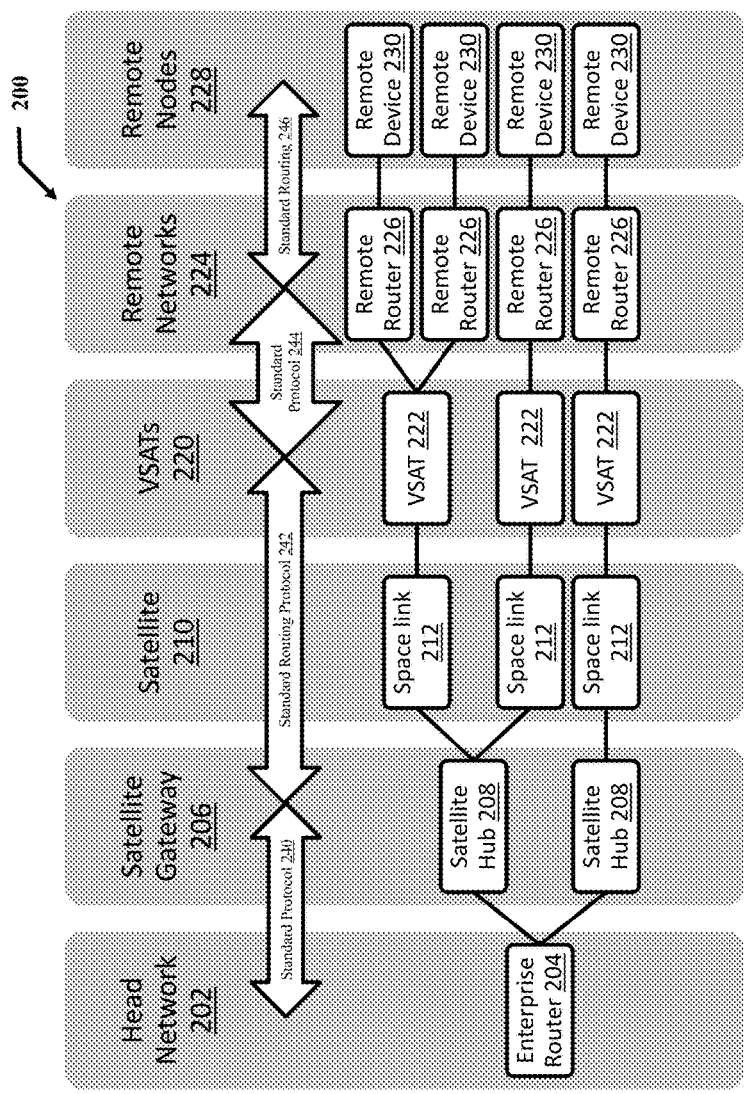
FIG. 2 illustrates an enterprise satellite network according to various embodiments.

FIG. 2 illustrates an enterprise satellite network according to various embodiments.

An enterprise satellite network 200 includes a head network 202 and a remote network 224. The head network 202 and the remote network 224 interface to one another by using an enterprise router 204 interfacing with a satellite gateway 206 that includes a satellite hub 208, a satellite 210 providing a space link 212 to link the satellite hub 208 with a Very Small Aperture Terminal (VSAT) 222, and a remote router 226. As such, a remote network 224 provided by the remote router 226 may interface a remote node 228 including a remote device 230 to the head network 202. A satellite hub 208 interfaces the enterprise router 204 to the remote router 226 using the space link 212 provided by the satellite 210. The space link 212 may be accessed by the satellite hub 208 at the head network 202 and by the VSAT terminal 222 at the remote networks 224 to form the enterprise network 200. The Enterprise Router 204 and the satellite gateway 206 may be deployed at the head office of the enterprise or at the data center of satellite service provider. The remote router 226 and the VSAT 222 may be deployed at a remote site of the enterprise.

In some embodiments, the enterprise network 200 may propagate IP routes using a standard routing protocol 240 between the enterprise router 204 and the satellite hub 208, a standard routing protocol 242 between the satellite hub 208 and the VSAT 222 over the space link 212, and a standard routing protocol 244 between the VSAT 222 and the remote router 226. Routing within a remote network 224 may be provided by a standard routing protocol 246.

Figure 3:
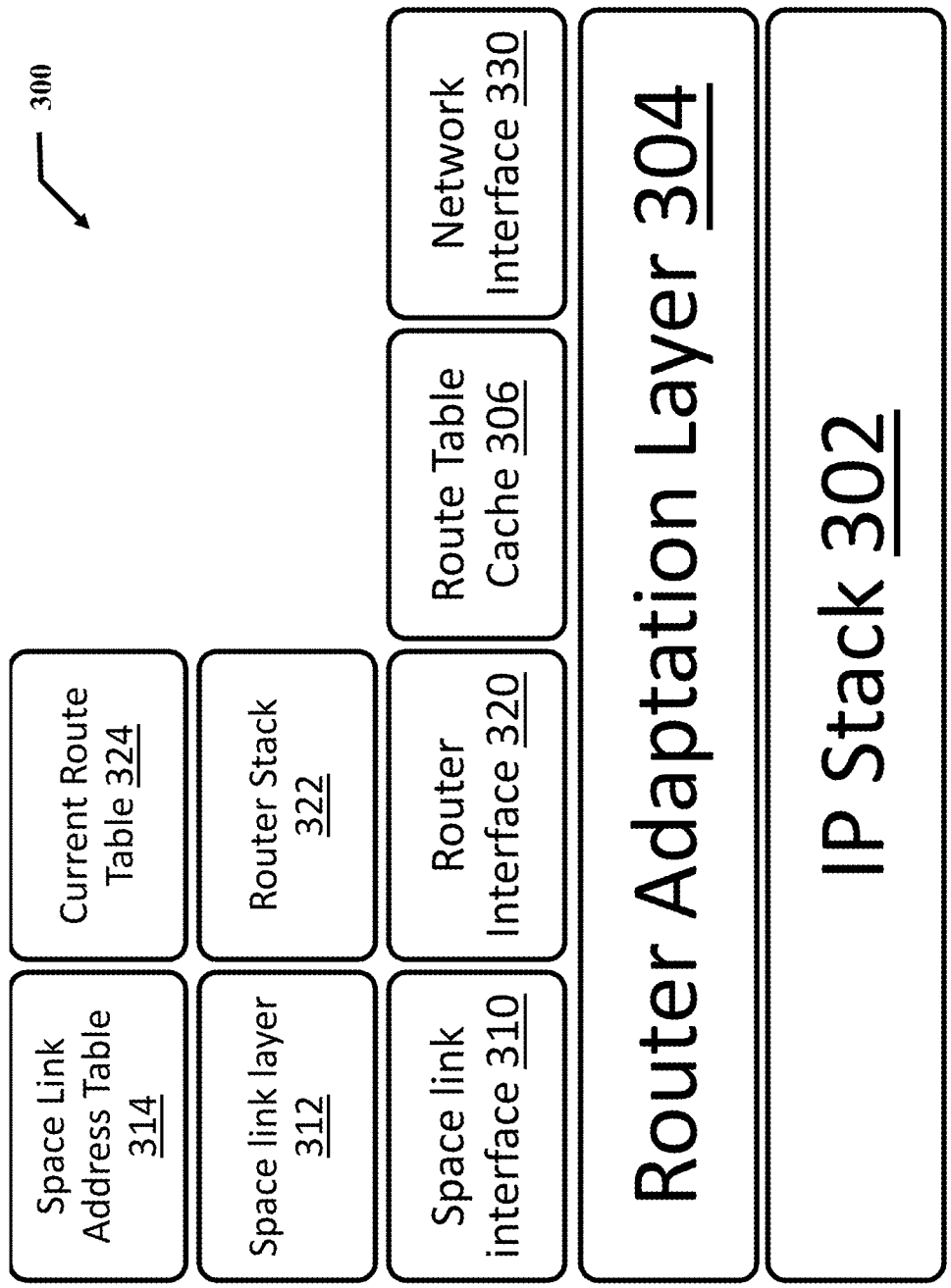
FIG. 3 illustrates a logical view of network adaptors and communications in a satellite communication apparatus according to various embodiments.

FIG. 3 illustrates a logical view of network adaptors and communications in a satellite communication apparatus according to various embodiments.

According to various embodiments, a satellite communication apparatus 300 may operate as a router in an enterprise network where at least some of the enterprise network communicates over a satellite link. The satellite communication apparatus 300 may operate as a satellite hub, a VSAT or the like. The router functionality may be enabled by adding a router adaptation layer 304 on the satellite communication apparatus 300. The satellite communication apparatus 300 may include an Internet Protocol (IP) stack 302, a router adaptation layer 304, a space link interface 310, a space link layer 312, a space link address table 314, a router interface 320, a router stack 322, a current route table 324, a route table cache 306 and a network interface 330.

Logically, the router adaption layer 304 may be disposed above an IP (Internet Protocol) stack 302. In Open Systems Interconnection (OSI) model terms, the router adaption layer 304 may be added at or above the IP layer. The router adaptation layer 304 on the satellite communication apparatus 300 may interface with a router stack 322 via a router interface 320. The router adaptation layer 304 may isolate away the satellite interface details, permitting the use of the routing stack 322 without any customization.

The router adaptation layer 304 may maintain a route table cache 306 listing IP routes. The route table cache 306 may be populated from the router stack 322 via, for example, the router interface 320 provided by the router adaptation layer 304. In some embodiments, the space link address table may be populated during initialization of the satellite communication apparatus 300.

In exemplary embodiments, the router adaptation layer 304 may interface with a space link layer 312 via a space link interface 310. In exemplary embodiments, the router adaptation layer 304 may interface with a network interface 330. The network interface 330 may include a Network Interface Card (NIC) supporting, for example, a wireless network, a Wi-Fi network, a wired network, or the like.

The router stack 322 may be selected from one or more standard routing protocol stacks for routing IP datagrams, for example, a Border Gateway Protocol (BGP) stack, or the like. The router stack 322 may maintain a current route table 324 for storing routes to various networks, whether the networks are directly linked on indirectly linked, and the interface to reach the network. For example, the interface to reach the network may be selected from the space link interface 310, the network interface 330, a loopback to the itself, or the like.

The current route table 324 may be populated by a configuration file, a configuration/operator interface, IP datagrams and the like.

In exemplary embodiments, the router stack 322 may provide the router interface 320 as an Application Programming Interface (API). In exemplary embodiments, the router stack 322 may provide the router interface 320 as an inter-process communication interface, for example, a socket, a loopback socket, shared memory, or the like. In exemplary embodiments, router adaptation layer 304 interfaces with a space link interface 310, the router interface 320, In exemplary embodiments, the space link layer 312 may interface with the router adaption layer via the space link interface 310. The space link layer 312 may provide a partial or full emulation of the IP layer in order to provide IP addressing over a space link. According to various embodiments, the space link layer 312 may include a space link address table 314 that maps proprietary satellite or space link addressing schemes to IP addresses, for example, VSAT terminal 1 may be mapped to IP address 10.10.10.1/25. The space link address table 314 may be populated by a configuration file, a configuration/operator interface, satellite communications, and the like. In some embodiments, the space link address table 314 may be populated as a VSAT associates with a satellite hub during provisioning of the VSAT or the satellite hub. In exemplary embodiments, the space link interface 310 may be provided as an Application Programming Interface (API). In exemplary embodiments, the space link interface 310 may be provided via an inter-process communication interface, for example, a socket, a loopback socket, shared memory, or the like.

In some embodiments, the router adaptation layer 304 or the space link layer 312 may update the current route table 324 of the router stack 322, when a VSAT associates or disassociates with a satellite hub.

Figure 4:
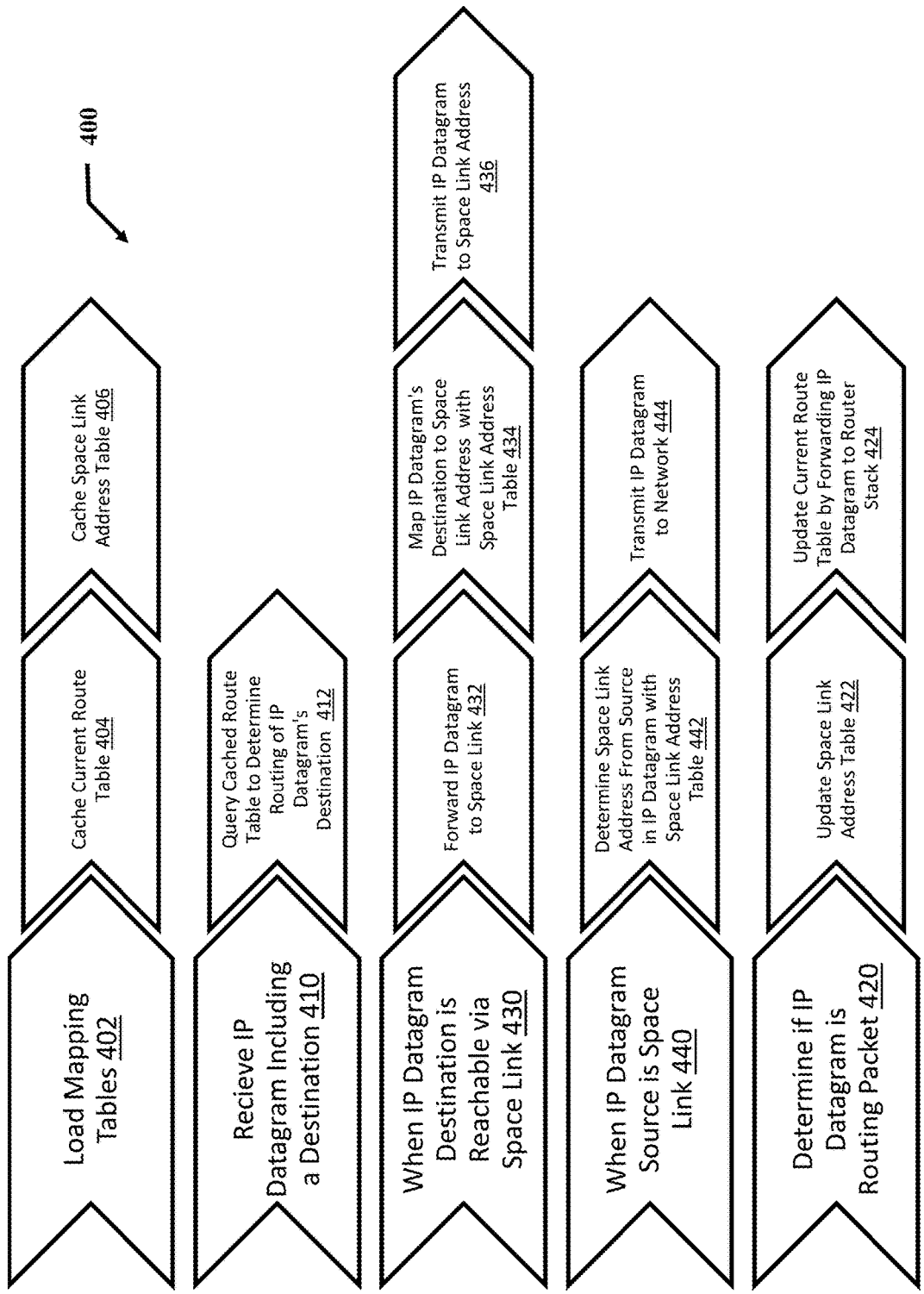
FIG. 4 is a flowchart of an exemplary method that may be implemented in an embodiment of the invention.

FIG. 4 is a flowchart of an exemplary method that may be implemented in an embodiment of the invention.

A method 400 may include operation load mapping tables 402. For example, the router adaptation layer may load/read the current routing table 324 from the router stack and perform an operation to cache the current route table 404. The loading of current routing table 324 is also illustrated by arrow 1 in FIG. 5. According to various embodiments, operation load mapping tables 402 may include initialing a satellite interface in order to cache space link address table at operation 404.

Method 400 may include receiving an IP datagram including a destination at operation 410. When an IP datagram is received at operation 410, method 400 may query a router stack to determine routing of IP Datagram per the IP Datagram's destination at operation 412. For example, the router adaptation layer 304 may query/consult the routing table cache 306 to determine if the message should be routed to a space link via the space link interface 310 or a network link via the network interface 330.

Figure 5:
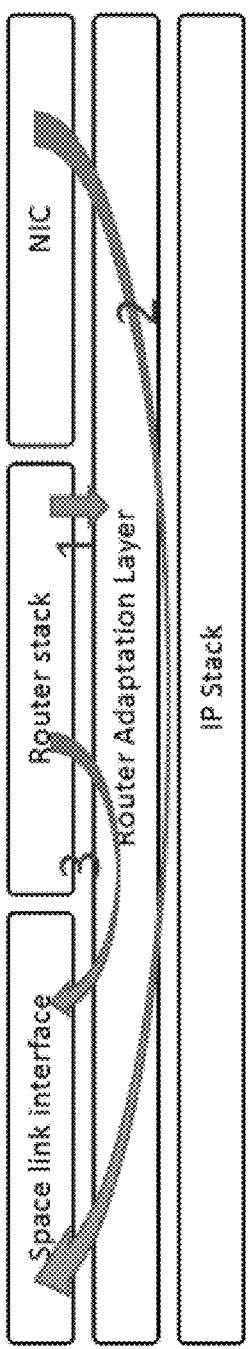
FIG. 5 illustrates a logical view of network adaptors and flow of Internet Protocol (IP) datagrams in a satellite communication apparatus according to various embodiments.

When the routing query at operation 412 determines that the IP datagram's destination is reachable via a space link at operation 430, operation 432 forwards or passes the IP datagram to the space link layer 312 via the space link interface 310; the forwarding of the IP datagram via the space link interface 310 is also illustrated by arrow 2 of FIG. 5. The IP datagram's destination may be addressed to a network directly or indirectly connected to the space link. In some embodiments, the space link may link a VSAT to a satellite hub, and vice-versa. The VSAT may be deployed at a remote office and the satellite hub may be deployed at an enterprise head office.

Figure 6:
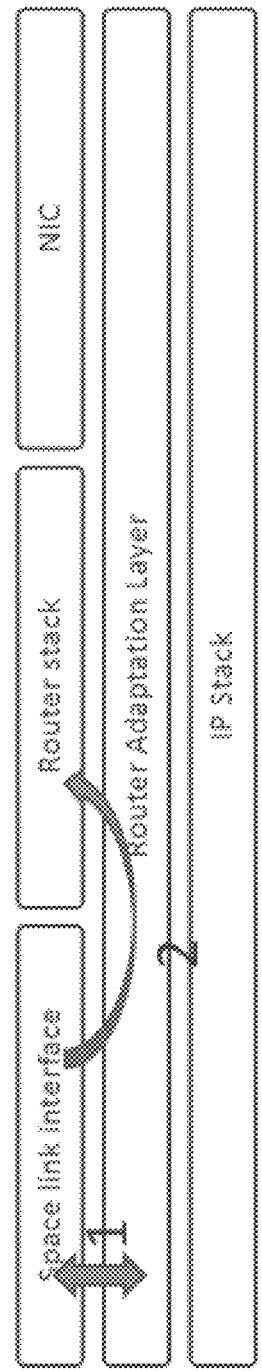
FIG. 6 illustrates a logical view of network adaptors and flow of Internet Protocol (IP) datagrams in a satellite communication apparatus according to various embodiments.

Conversely, according to various embodiments, when the routing query at operation 412 determines that the IP datagram is not reachable via the space link, the IP datagram is forwarded or passed onto the network interface 330 by routing the IP datagram with the router adaptation layer 304; this is also illustrated by arrow 1 of FIG. 6.

According to various embodiments, after operation 432 the method 400 may include mapping the IP Datagram's Destination to a space link address with the space link address table 314 at operation 434. Operation 434 may be performed by the space link layer 312. After operation 434, a radio linked to the satellite communication apparatus 300 may be used to transmit the IP datagram to the space link address at operation 436.

In method 400, when it is determined that the IP Datagram source is via the space link at operation 440, method 400 may determine a space link address from a source address in the IP datagram at operation 442. Operation 442 may be based on the space link address table 314. After operation 442, method 400 may include transmitting IP datagram's received the space link to the network at operation 444. The transmitting of the space link originating IP datagram may be performed with the network interface 330.

In some embodiments, method 400 includes determining if the IP datagram includes a routing packet at operation 420. Method 400 routes space link bound routing packets, for example, BGP packets, to the space link interface 310 at operation 432; this is also illustrated by arrow 3 of FIG. 5. In some embodiments, method 400 includes updating the space link address table 314 at operation 422. According to various embodiments, any locally generated routing packets or non-space link originating routing packets are forwarded to the space link interface 310. Conversely, any space link originating routing packets are forwarded to the router stack 322; this is also illustrated by arrow 2 of FIG. 6. For example, when using the BGP protocol, all BGP traffic addressed to a VSAT router or satellite hub gets forwarded to the space link interface 310.

The role played by the hub router adaptation layer in space-link bound traffic is identified by the arrows in FIG. 5.

Exemplary Embodiment

According to various embodiments, proprietary space-link routing may be replaced with a standard routing protocol, such as, BGP. By using BGP, route maps, access lists and BGP communities support may be added to the enterprise. Furthermore as BGP uses TCP as the transport protocol, reliability of the routing is improved. Moreover, BGP is spectrally efficient as it only exchanges delta routing updates for routing changes.

In some embodiments, BGP is used to carry routing information over the space link by implementing the standard routing protocol 242 of FIG. 2 with a BGP protocol stack. In this implementation, a standard off-the-shelf software router stack may be used to implement the hub and VSAT routers. Use of BGP over a satellite link may provide benefits, such as:

BGP communities
BGP route reflector/route server setup
Route-maps and access lists
Routing updates are handled efficiently as BGP only sends delta updates when network topology changes.

BGP uses TCP as the transport layer. This improves the reliability of the routing in presence of radio link packet losses.

Figure 7:
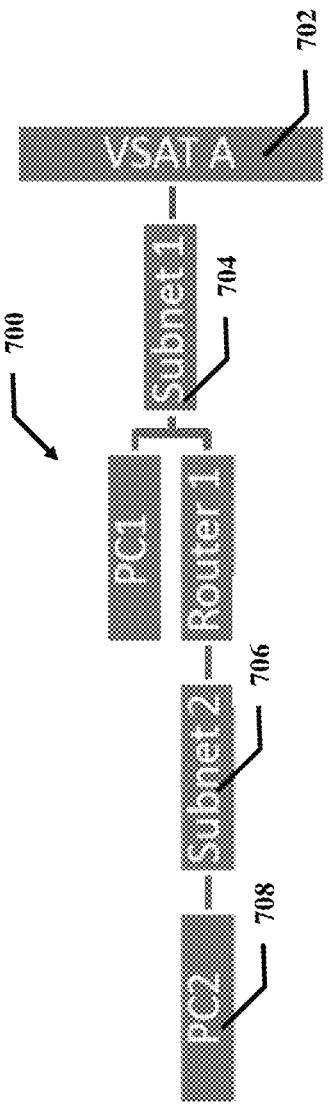
FIG. 7 illustrates a logical view of a remote network according to various embodiments.

FIG. 7 illustrates a logical view of a remote network according to various embodiments.

According to various embodiments, the Router Adaptation Layer in place, a satellite hub or gateway (not shown) can route IP datagrams to a hidden subnet 706 (Subnet 2) that is behind subnet 704 (Subnet 1). With a standard internet routing protocol communicating over a satellite link communicating with a VSAT 702, the satellite hub and the VSAT 702 may map a packet addressed to a PC 708 (PC 2) on subnet 706 (Subnet 2). The satellite hub maps the address of subnet 706 of the PC 708 (Subnet 2) to subnet 704 (Subnet 1). Once this mapping is established, the space link layer on the satellite hub maps subnet 704 (Subnet 1) and subnet 706 the space link address of VSAT 704.

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

We claim as our invention:

1. An apparatus to route an Internet Protocol (IP) datagram with a standard internet routing protocol over a space link, the apparatus comprising:
  a router stack configured to route according to the standard internet routing protocol comprising a current routing table comprising routing per the standard internet routing protocol via the space link; and
  a router adaptation layer configured to:
    receive an Internet Protocol (IP) datagram comprising a destination,
    query the router stack to determine whether the destination is linked via the space link, and
    forward the IP Datagram to a space link address when IP datagram's destination is linked via the space link,
  wherein the router stack interfaces with the router adaptation layer, and
  the apparatus is configured to operate as a satellite gateway comprising a plurality of satellite hubs, the router adaption layer comprises a plurality of router adaption layers, and there is a correspondence between the plurality of router adaptation layers and the plurality of satellite hubs.

2. The apparatus of claim 1, wherein the IP datagram comprises a routing packet comprising a route received over the space link interface, and the router adaptation layer is further configured to update a table mapping space link addresses to IP addresses based on the route.

3. The apparatus of claim 1, wherein the IP datagram comprises a routing packet comprising a route received over the network interface, and the router adaptation layer is further configured to forward the IP datagram to the destination via the space link.

4. The apparatus of claim 1, wherein the IP datagram is received over a network interface and transmitted over the space link.

5. The apparatus of claim 1, wherein the IP Datagram is received over the space link and the router adaptation layer is further configured to determine a space link source address from a source address in the IP datagram.

6. The apparatus of claim 1, wherein the apparatus is configured to operate as a Very Small Aperture Terminal (VSAT).

7. The apparatus of claim 1, wherein the apparatus is configured to operate as a satellite hub.

8. The apparatus of claim 1, wherein the standard internet routing protocol is compliant with the Border Gateway Protocol (BGP).

9. A system to route an Internet Protocol (IP) datagram with a standard internet routing protocol over a space link comprising:
    a Very Small Aperture Terminal (VSAT) comprising:
        a VSAT router stack configured to route according to the standard internet routing protocol comprising a VSAT current routing table comprising routing per the standard internet routing protocol via the space link, and
        a VSAT router adaptation layer configured to receive an Internet Protocol (IP) datagram comprising a destination, query the VSAT router stack to determine whether the destination is linked via the space link, and forward the IP Datagram to a space link address when IP datagram's destination is linked via the space link; and
    a satellite hub comprising:
        a router stack configured to route according to the standard internet routing protocol comprising a current routing table comprising routing per the standard internet routing protocol via the space link, and
        a router adaptation layer configured to receive an IP datagram comprising a destination, query the router stack to determine whether the destination is linked via the space link, and forward the IP Datagram to a space link address when IP datagram's destination is linked via the space link; and
    wherein the router stack communicates with the VSAT router stack via the space link, the router stack interfaces with the router adaptation layer, the VSAT router stack interfaces with the VSAT router adaptation layer, and the standard internet routing protocol is compliant with the Border Gateway Protocol (BGP).

10. The system of claim 9, wherein the IP datagram comprises a routing packet comprising a route received over the space link interface, and the router adaptation layer is further configured to update a table mapping IP addresses to space link addresses based on the route.

11. The system of claim 9, wherein the IP datagram comprises a routing packet comprising a route received over the network interface, and the router adaptation layer is further configured to forward the IP datagram to the destination via the space link.

12. The system of claim 9, wherein the IP Datagram is received over a network interface at the satellite hub and transmitted over the space link.

13. The system of claim 9, wherein the IP datagram is received over the space link and the router adaptation layer is further configured to determine a space link source address from a source address in the IP datagram.

14. The system of claim 9, wherein the router adaption layer comprises a plurality of router adaption layers.

15. A method to route an Internet Protocol (IP) datagram with a standard internet routing protocol over a space link, the method comprising:
    routing, by a router stack, according to the standard internet routing protocol comprising a current routing table comprising routing per the standard internet routing protocol via the space link;
    receiving, by a router adaptation layer, an IP datagram comprising a destination;
    querying, by the router adaptation layer, a router stack to determine whether the destination is linked via the space link;
    forwarding, by the router adaptation layer, the IP Datagram to a space link address when IP datagram's destination is linked via the space link; wherein the router stack interfaces with the router adaptation layer;
    wherein the method is operated by a satellite gateway comprising a plurality of satellite hubs, the router adaption layer comprising a plurality of router adaption layers, and there is a one-to-one correspondence between the plurality of router adaptation layers and the plurality of satellite hubs.

16. The method of claim 15, wherein the IP datagram comprises a routing packet comprising a route received over the space link interface, and the method further comprises updating a table mapping space link addresses to IP addresses based on the route.

17. The method of claim 15, wherein the IP datagram comprises a routing packet comprising a route received over the network interface, and the method further comprises forwarding the IP datagram to the destination via the space link.

18. The method of claim 15, further comprising: receiving the IP datagram over a network interface; and transmitting the IP datagram over the space link.

19. The method of claim 15, further comprising: receiving the IP Datagram over the space link; and determining a space link source address from a source address in the IP datagram.

20. The method of claim 15, wherein the standard internet routing protocol is compliant with the Border Gateway Protocol (BGP).

* * * * *